Patented July 4, 1933

1,916,274

UNITED STATES PATENT OFFICE

HERBERT E. MARTIN AND JAMES W. ELDER, OF CUMBERLAND, MARYLAND, ASSIGNORS TO CELANESE CORPORATION OF AMERICA, A CORPORATION OF DELAWARE

PROCESS OF PREPARING ORGANIC ESTERS OF CELLULOSE

No Drawing.    Application filed December 8, 1928.  Serial No. 324,799.

This invention relates to the preparation of organic esters of cellulose and particularly cellulose acetate, and more specifically is directed to the preparation of organic esters of cellulose by a process that is not only more expeditious than the prior processes but also produces a superior product.

An object of our invention is to provide a process for the esterification and particularly the acetylation of cellulose, wherein the cellulosic material is pretreated with the anhydride of a lower aliphatic acid. Other objects of our invention will appear from the following detailed description.

It has been proposed to pretreat cellulosic material with organic acids such as acetic acid, etc., to render the same more reactive to esterifying agents. We have found that if cellulosic material is pretreated with the anhydride of a fatty acid in the absence of an esterifying catalyst and preferably the anhydride of the acid corresponding to the acid radicle of the cellulose ester to be formed, very satisfactory results are obtained. Not only is the subsequent esterifying process improved, but the use of anhydrides of acids present a great advantage in that their melting points are lower than that of the corresponding acid. Thus glacial acetic acid readily freezes, so that in cold weather, special precautions must be taken to prevent the same from freezing, or if it is frozen the same must be heated in order to melt it. On the other hand, acetic anhydride does not solidify at atmospheric temperatures ordinarily prevailing even in the coldest months.

In accordance with our invention we pretreat cellulosic material with an anhydride of a lower aliphatic acid in the absence of catalyst. The so pretreated material may then be subjected directly to an esterifying process, but we prefer to subject the so pretreated material to a secondary pretreatment prior to the esterification process.

The cellulosic material that is to be treated in accordance with our invention may be any suitable cellulosic material commonly employed for making cellulose esters. Examples of such cellulosic materials are cotton, cotton linters, purified wood pulp, reconstituted cellulose, etc.

The pretreatment process comprises the treatment of the cellulosic material with a relatively small proportion of an anhydride of a lower fatty acid, such as acetic anhydride, propionate anhydride, etc. The acetic anhydride may be applied to the cellulosic material in any suitable manner, either in the form of a liquid, or in the form of a vapor. One mode of pretreatment comprises the agitation of the cellulosic material with a relatively small amount of acetic anhydride in a suitable apparatus, say a horizontal type of agitator, or a rotating drum.

Instead of employing the organic acid anhydride in the liquid state, pretreatment may be effected by subjecting the cellulosic material to the vapors of the anhydride, such as acetic anhydride, the vapors being employed either alone or in admixture with an inert gaseous carrier such as air, nitrogen, carbon dioxide, etc., or the vapors may be generated by soaking the cellulosic material in the anhydride and subsequently passing air or other inert gas through the material.

The temperature of the pretreatment may be boiling temperatures of the organic acid anhydride used, or it may be below such temperatures, and may be ordinary temperatures or even below ordinary temperatures. The time of pretreatment may be varied from 1 hour to 5 hours or more, depending upon the amount and nature of the anhydride employed, and the temperature of reaction. The amount of anhydride employed may be varied within wide limits. Thus the amount of acetic anhydride added may be less than that which would be required to combine with the water present in the cellulosic material to form acid of 100% strength, so that if acetic anhydride is added in such amounts, all of it combines with the water present. On the other hand, the amount of acetic anhydride employed may be so great that it could combine with all of the water present to form acetic acid and still some excess of acetic anhydride would remain. The anhydride of the fatty acid may be added in admixture with the corresponding or different acids such as glacial acetic acid, propionic acid, butyric acid, etc.

As examples of amounts of organic acid anhydride that may be employed, it may be stated that if 170 lbs. of cotton linters having a normal moisture content of about 5% are employed, the addition thereto of 35 lbs. of a mixture containing 40 parts of acetic anhydride and 60 parts of glacial acetic acid, produces an acid of 86% content. If 35 lbs. of acetic anhydride is added to this amount of cotton, an acid of 93% concentration is formed. If 55 lbs. of acetic anhydride is added to this amount of cotton linters, an acid of 100% concentration is formed. If amounts greater than 55 lbs. of acetic anhydride are added, uncombined acetic anhydride remains.

After the cellulosic material has been subjected to the pretreatment process above described, it may then be subjected directly to an esterifying process. However, we prefer to subject the material to another preliminary treatment which we term a "secondary pretreatment". This secondary pretreatment comprises subjecting the cellulosic material to a bath containing the liquids normally used for esterifying cellulose, but which bath contains little or no catalyst for promoting the esterification, so that practically no esterification takes place. During this secondary pretreatment, any water that may be contained in the cellulosic material is destroyed, and probably the cellulose is hydrolized to some extent. The mixture of cellulosic material and secondary pretreatment bath is stirred for a while and then a small amount of alkaline material or alkaline salts of weak acids, e. g. sodium acetate, is added to neutralize the trace of acid catalyst that is present and the mass is then further stirred. As stated, the secondary pretreatment bath contains a mixture of liquids such as are used for esterifying cellulose minus the necessary catalyst. Thus if cellulose acetate is to be made, the secondary pretreatment bath will contain acetic anhydride and a solvent or diluent such as glacial acetic acid or benzol.

When the secondary pretreatment is employed, after the same has been effected, the esterification process is initiated. During the secondary pretreatment, no cooling is necessary although it may be used. The mixture is then cooled to some extent to a temperature sufficiently low so that the temperature during esterification may not exceed a certain maximum, say 60° C. The esterifying catalyst, such as sulphuric acid, zinc chloride or the like is then added and the esterification process now proceeds. Due to the prior treatments, the cellulosic material is in a very reactive and uniform condition so that upon addition of the catalyst, a very smooth and quick reaction takes place. In the case of the acetylation of cellulose, the temperature rises in the course of 30 minutes from 8° or 10° C. to about 40° to 45° C. At the peak temperature the acetylation process is practically completed. The reacting mass is then cooled, and may then be subjected to any after treatments such as ripening to desired solubility, stabilization, etc.

As stated the secondary pretreatment need not necessarily be performed, but the cellulosic material that has been pretreated with the anhydride of the fatty acid may be subjected directly to any desired esterification process.

By the combination of pretreatment and secondary pretreatment of the cellulosic material prior to esterification, superior products are produced in a shorter time. The pretreatment process alone prior to esterification produces cellulose esters that are superior to those formed without a pretreatment process. While a secondary pretreatment alone prior to esterification shortens the time required for esterification, the product formed is often inferior to those formed without secondary pretreatment. By combining the pretreatment and the secondary pretreatment processes, the results obtained are surprising in that not only is the process speeded up, as would be expected from the secondary pretreatment, but the quality of the cellulose ester produced is superior to that that would be expected from the pretreatment operation.

Because of the greater speed of reaction, the output of a given esterifying apparatus is increased from 50 to 60%. Moreover, since by this process, the amount of cooling required is less than in the former processes, a great saving is effected.

The process may be employed for preparing various organic esters of cellulose such as cellulose acetate, cellulose propionate or cellulose butyrate. However, further details will be given with respect to the manufacture of cellulose acetate and the properties of cellulose acetate produced in accordance with our invention.

Cellulose acetate, when made by the combined pretreatment and secondary pretreatment process prior to acetylation, is superior to cellulose acetate formed either by pretreatment or by secondary pretreatment alone, or by no pretreatment or no secondary pretreatment, both in clarity and resistance to delustering.

As to clarity, it is pointed out that cellulose acetate when made in accordance with our process by combined pretreatment and secondary pretreatment has a clarity which is superior to the clarity of cellulose acetate made under identical conditions with pretreatment, but with no secondary pretreatment, while cellulose acetate when made with no pretreatment, either with or without secondary pretreatment, has a clarity which is still lower.

Because of the high clarity of the cellulose acetate, savings in filtration of its solution to be used in spinning yarns are effected, and the filtered product is superior to former cellulose acetate solutions.

Because of its great clarity, both before and after filtration, the cellulose acetate made by pretreatment and secondary pretreatment in accordance with our invention produces films, sheets, blocks, rods or other plastic or molded articles of better appearance than can be made of prior cellulose acetate. The use of this cellulose acetate in the making of molding powders containing finely divided cellulose acetate and plastifiers that may be molded under heat and pressure in the absence of volatile solvents, is of great advantage because of the great clarity of the cellulose acetate made in accordance with our invention, since filtration is not used in making such molding powders.

When yarns are made from ordinary cellulose acetate, the yarns or fabrics produced therefrom become delustered when subjected to the action of boiling water or boiling dilute soap solutions. However, yarns or fabrics made of cellulose acetate made in accordance with our invention are somewhat resistant to the action of boiling water or boiling soap solutions, so that yarns or fabrics made of cellulose acetate prepared in accordance with our invention can be treated for a longer time in such hot aqueous baths without losing their luster appreciably. This property of resistance to delustering in boiling water or soap solutions is of benefit, for instance in the dyeing or cleaning of such yarns or fabrics.

To further illustrate our invention but without in any way being limited thereto, the following detailed description of one mode of carrying out the same will be given, wherein our pretreatment process is combined with a secondary pretreatment process prior to esterification.

*Example*

The cellulosic material is first subjected to a pretreatment process which comprises, for instance, the following. 170 lbs. of willowed cotton linters containing a moisture content of about 5%, are charged in a wooden or metal vessel of the horizontal type. Onto this cotton there is sprayed by a perforated pipe 35 lbs. of acetic anhydride. The mixture is stirred in the wooden vessel for a period of time which may be up to 3 hours. While the pretreatment is going on, the acetylizer proper is charged with 925 lbs. of a mixture of glacial acetic acid and acetic anhydride, the acetic anhydride comprising 38 to 39% of the mixture. This mixture of acetic anhydride and glacial acetic acid also contains about 2 ounces of sulphuric acid. This mixture is cooled in the acetylizer to about 5° C.

After the cellulosic material has been pretreated in the manner above described, it is discharged from the pretreater into the acetylizer containing the acetic acid and acetic anhydride, the operation taking 10 to 15 minutes. A rise in temperature, which may be approximately 10° C., occurs in the acetylizer. The temperature of the charge is reduced by cooling, and 4 ounces of sodium carbonate are added to the mass. Stirring is continued for about an hour, and this part of the process comprises the secondary pretreatment.

To cause acetylation, a mixture containing 13 to 16%, say 14½% of sulphuric acid, based on the weight of the cellulose employed, and 100 lbs. of a mixture of acetic anhydride and glacial acetic acid of the strength above mentioned, is now added. If desired, smaller amounts of sulphuric acid, such as 2% based on the cellulose may be employed. The temperature rises in the course of about 25 minutes to 43° C., which is the peak of the reaction. The acetylation reaction is now practically complete and there are practically no visible fibres in the mass. The mass is then cooled down and may be ripened to any suitable solubility by the addition of water, etc., or in any other suitable manner and preferably to the normal acetone soluble stage. The cellulose acetate thus formed may be stabilized, ground, etc. as desired.

It is to be understood that the foregoing detailed description is given merely by way of illustration and that many variations may be made therein without departing from the spirit of our invention.

Having described our invention, what we claim and desire to secure by Letters Patent is:

1. In the method of making organic esters of cellulose, the step of pretreating material consisting essentially of cellulose by adding thereto a reagent comprising the anhydride of a lower fatty acid as the sole active agent and containing substantially no esterifying catalyst prior to esterification, said anhydride being in the liquid state.

2. In the method of making cellulose acetate, the step of pretreating material consisting essentially of cellulose by adding thereto a reagent comprising liquid acetic anhydride as the sole active agent and containing substantially no esterifying catalyst prior to acetylation.

3. In the method of making organic esters of cellulose, the step of pretreating cellulose by applying thereto first a reagent comprising a liquid anhydride of a lower fatty acid as the sole active agent and containing substantially no esterifying catalyst, and then a reagent comprising a lower fatty acid anhydride, a diluent therefor and a quantity of catalyst insufficient to cause appreciable esterification.

4. The method of preparing organic esters of cellulose comprising subjecting cellulose to pretreatment first by agitating the same with a relatively small amount of the anhydride of a lower fatty acid and then by treating the treated cellulose with a reagent comprising a lower fatty acid anhydride, a diluent therefor and a quantity of catalyst insufficient to cause appreciable esterification and then subjecting the thus pretreated cellulose to the action of an esterification promoting catalyst to cause esterification.

5. The method of preparing cellulose acetate comprising subjecting cellulose to pretreatment first by agitating the same with a relatively small amount of the anhydride of a lower fatty acid and then by treating the treated cellulose with a reagent comprising acetic anhydride, a diluent therefor and a quantity of catalyst insufficient to cause appreciable acetylation and then subjecting the thus pretreated cellulose to the action of an acetylation promoting catalyst to cause acetylation.

6. The method of preparing cellulose acetate comprising subjecting cellulose to pretreatment first by agitating the same with a relatively small amount of the acetic anhydride and then by treating the treated cellulose with a reagent comprising acetic anhydride, a diluent therefor and a quantity of catalyst insufficient to cause appreciable acetylation and then subjecting the thus pretreated cellulose to the action of an acetylation promoting catalyst to cause acetylation.

7. The method of preparing cellulose acetate comprising subjecting cellulose to pretreatment first by agitating the same with a relatively small amount of the acetic anhydride and then by treating the treated cellulose with a reagent comprising acetic anhydride, acetic acid and a quantity of catalyst insufficient to cause appreciable acetylation and then subjecting the thus pretreated cellulose to the action of sulphuric acid to cause acetylation.

In testimony whereof, we have hereunto subscribed our names.

HERBERT E. MARTIN.
JAMES W. ELDER.